United States Patent
Kim et al.

(10) Patent No.: US 7,952,501 B2
(45) Date of Patent: May 31, 2011

(54) DEMODULATOR CAPABLE OF COMPENSATING OFFSET VOLTAGE OF RF SIGNAL AND METHOD THEREOF

(76) Inventors: Sung Wan Kim, Seongnam-si (KR); Pyeong Han Lee, Seongnam-si (KR); Sung Hun Chun, Gunpo-si (KR)

(*) Notice: Subject to any disclaimer, the term of this patent is extended or adjusted under 35 U.S.C. 154(b) by 0 days.

(21) Appl. No.: 12/282,605

(22) PCT Filed: Sep. 19, 2007

(86) PCT No.: PCT/KR2007/004560
§ 371 (c)(1),
(2), (4) Date: Sep. 16, 2009

(87) PCT Pub. No.: WO2008/140155
PCT Pub. Date: Nov. 20, 2008

(65) Prior Publication Data
US 2010/0219995 A1    Sep. 2, 2010

(30) Foreign Application Priority Data
May 11, 2007 (KR) .................. 10-2007-0045924

(51) Int. Cl.
H03M 1/06 (2006.01)
(52) U.S. Cl. ........ 341/118; 341/119; 341/120; 341/121; 341/143; 341/155
(58) Field of Classification Search .......... 341/118–121, 341/143, 155
See application file for complete search history.

(56) References Cited

U.S. PATENT DOCUMENTS

| | | | | |
|---|---|---|---|---|
| 4,392,123 A * | 7/1983 | Bruggemann | ................ | 341/143 |
| 5,187,482 A * | 2/1993 | Tiemann et al. | ............... | 341/143 |
| 5,745,060 A * | 4/1998 | McCartney et al. | .......... | 341/120 |
| 5,835,041 A * | 11/1998 | Zydek et al. | .................. | 341/143 |
| 6,556,239 B1 * | 4/2003 | Al-Araji et al. | ............... | 348/192 |
| 6,822,592 B2 * | 11/2004 | Gandolfi et al. | ............. | 341/143 |
| 6,954,160 B1 * | 10/2005 | Burkland et al. | ............. | 341/143 |
| 7,042,377 B2 * | 5/2006 | Oliaei | ......................... | 341/143 |
| 7,061,989 B2 * | 6/2006 | Bellaouar et al. | ............. | 375/295 |
| 7,129,867 B2 * | 10/2006 | Kim et al. | ..................... | 341/118 |
| 7,164,375 B2 * | 1/2007 | Sawada | ........................ | 341/143 |
| 7,365,668 B2 * | 4/2008 | Mitteregger | .................. | 341/143 |
| 7,420,494 B1 * | 9/2008 | Schreier | ........................ | 341/143 |
| 2005/0140530 A1 * | 6/2005 | Koike | ........................... | 341/118 |
| 2006/0071835 A1 * | 4/2006 | Inukai | ........................... | 341/143 |
| 2006/0164272 A1 * | 7/2006 | Philips et al. | ................. | 341/143 |
| 2007/0120715 A1 * | 5/2007 | Zierhofer | ..................... | 341/143 |

* cited by examiner

*Primary Examiner* — Linh V Nguyen
(74) *Attorney, Agent, or Firm* — Todd L. Juneau

(57) ABSTRACT

A demodulator capable of compensating for an offset voltage of a radio frequency (RF) signal, and a method of compensating for the offset voltage of the RF signal are provided. The demodulator includes an analog-to-digital conversion (ADC) unit for converting a first analog signal corresponding to a difference between the RF signal comprising the offset voltage and an analog reference signal into a first digital signal, and a compensation voltage generation unit for converting the first digital signal into an offset compensation voltage. The ADC unit converts a second analog signal corresponding to a difference between the RF signal comprising the offset voltage and the offset compensation voltage into a second digital signal. Accordingly, the offset voltage included in the RF signal is compensated for, and thus distortion and a signal-to-noise ratio (SNR) of the RF signal are reduced. This leads to an improvement of the reception sensitivity of an RF receiver.

11 Claims, 2 Drawing Sheets

[Fig. 1]
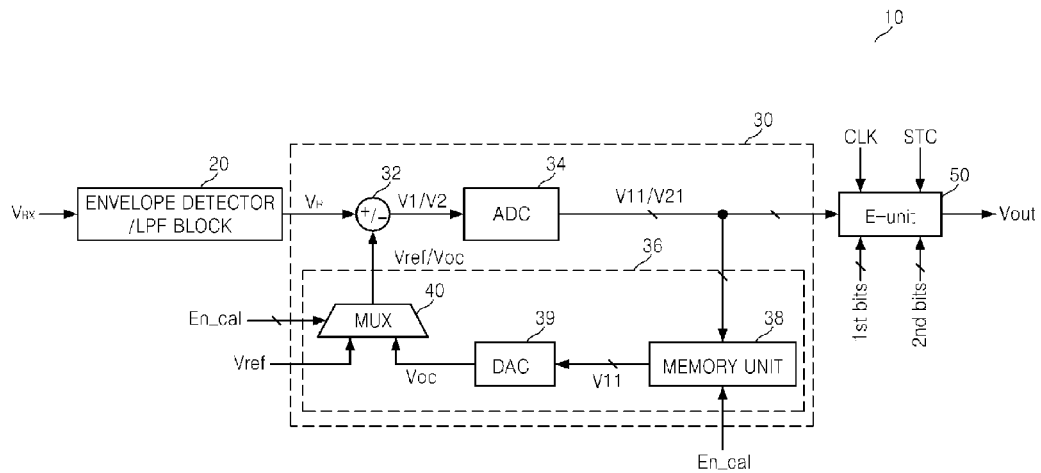
[Fig. 2]
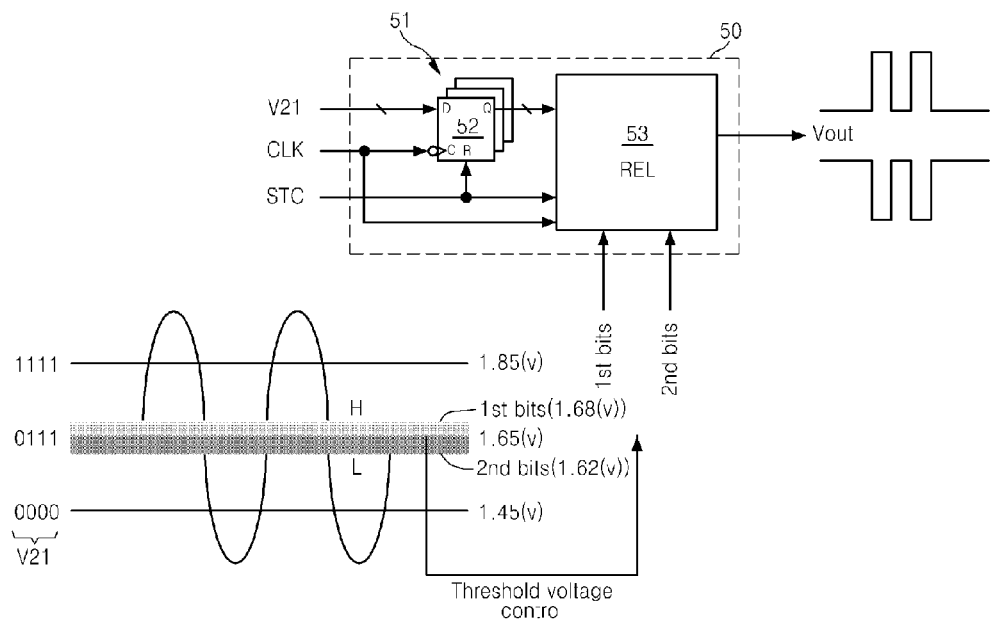
[Fig. 3]
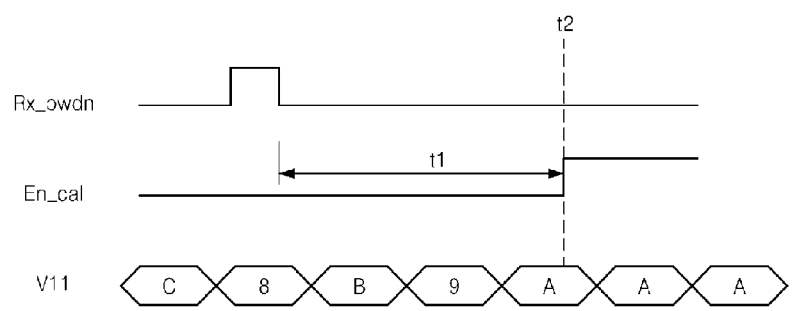

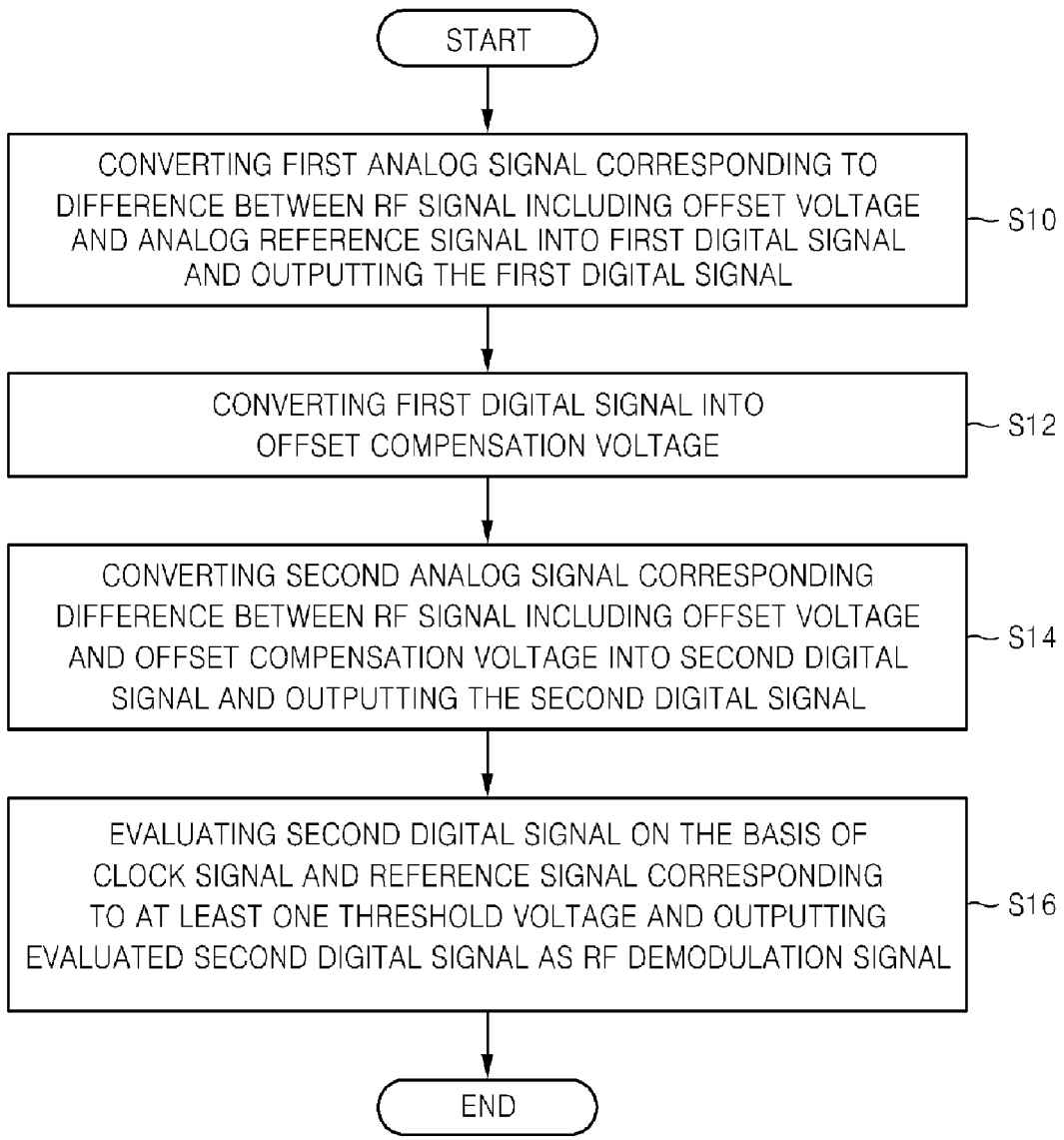
[Fig. 4]

DEMODULATOR CAPABLE OF COMPENSATING OFFSET VOLTAGE OF RF SIGNAL AND METHOD THEREOF

TECHNICAL FIELD

An embodiment of the present invention relates to a demodulator, and more particularly, to a demodulator capable of compensating for an offset voltage of a radio frequency (RF) signal and a method of compensating for an offset voltage of an RF signal.

BACKGROUND ART

Typically, radio frequency identification (RFID) systems may be classified into an inductively coupled system and an electromagnetic wave system according to wireless connecting methods. The inductively coupled system is used in RFID systems for short distances (i.e., 1 m or less), and enables an RF signal receiver (for example, a reader) and an RF signal transmitter (for example, an RF tag) to perform wireless communications by using coil antennas.

An RF tag in the inductively coupled system is almost manually operated. In other words, all of energies required for an IC chip of the RF tag to operate are supplied by a reader. Accordingly, an antenna coil of the reader generates a strong magnetic field at its neighboring area. A part of the magnetic field emitted by the antenna coil generates an inductive voltage in a coil antenna of the RF tag, and the inductive voltage is rectified and then supplied as an energy for the IC chip.

The electromagnetic wave system is used in RFID systems for middle and long distances, and enables a reader and an RF tag to perform wireless communications by using RF antennas. Since the RF tag in the electromagnetic wave system cannot receive a sufficient amount of power for driving an IC chip from the reader, an RF tag (for example, an active type tag) including an additional battery for long-distance recognition may be used.

Each of the reader and the RF tag processes baseband data according to several digital types of coding. An RF signal generated by the RF tag may include an offset voltage. Therefore, the RF signal may be distorted by the offset voltage, and a signal-to-noise ratio (SNR) may be degraded. Consequently, reception sensitivity of the reader may decrease.

DETAILED DESCRIPTION OF THE INVENTION

Technical Problem

The present invention provides a demodulator that includes an offset voltage compensation voltage generation block and is capable of compensating for an offset voltage of an RF signal received from an RF tag, and a method of compensating for the offset voltage of the RF signal.

Advantageous Effects

In a demodulator and a method of compensating for an offset voltage included in an RF signal according to the present invention, distortion and a signal-to-noise ratio (SNR) of the RF signal are reduced by compensating for the offset voltage of the RF signal. Thus, reception sensitivity of an RF receiver can be improved.

DESCRIPTION OF THE DRAWINGS

The above and other features and advantages of the present invention will become more apparent by describing in detail exemplary embodiments thereof with reference to the attached drawings in which:

FIG. 1 is a function block diagram of a demodulator according to an embodiment of the present invention;

FIG. 2 is a function block diagram of an output unit of the demodulator illustrated in FIG. 1, FIG. 3 is a timing diagram for explaining an operation of an offset voltage compensation unit of the demodulator illustrated in FIG. 1; and FIG. 4 is a flowchart of a method of compensating for an offset voltage of an RF signal, according to an embodiment of the present invention.

BEST MODE

According to an aspect of the present invention, there is provided a demodulator comprising an analog-to-digital conversion (ADC) unit for converting a first analog signal corresponding to a difference between a radio frequency (RF) signal comprising an offset voltage and an analog reference signal into a first digital signal, and a compensation voltage generation unit for converting the first digital signal into an offset compensation voltage. The ADC unit may convert a second analog signal corresponding to a difference between the RF signal comprising the offset voltage and the offset compensation voltage into a second digital signal.

The ADC unit may include a subtractor for subtracting the analog reference signal from the RF signal so as to output the first analog signal, and an analog-to-digital converter (ADC) for converting the first analog signal output by the subtractor into the first digital signal. The subtractor may subtract the offset compensation voltage from the RF signal so as to output the second analog signal, and the ADC may convert the second analog signal into the second digital signal.

The compensation voltage generation unit may comprise a memory unit for storing the first digital signal in response to a compensation enable signal, a digital-to-analog converter (DAC) for converting the first digital signal stored in the memory unit into the offset compensation voltage, and a MUX for outputting one of the analog reference signal and the offset compensation voltage in response to the compensation enable signal.

The demodulator may further comprise an envelope detector/low-pass filter block for detecting an envelope of an RF transmission signal output by an RF transmitter, performing low-pass filtering on the envelope, and outputting the RF signal. The demodulator may further comprise an output unit for evaluating the second digital signal on the basis of a clock signal and at least one reference signal corresponding to at least one threshold voltage and outputting the evaluated second digital signal as an RF demodulation signal. The demodulator may be implemented in an RF card reader.

According to another aspect of the present invention, there is provided a method of compensating for an offset voltage of an RF signal, the method comprising the operations of: converting a first analog signal corresponding to a difference between the RF signal comprising an offset voltage and an analog reference signal into a first digital signal; converting the first digital signal into an offset compensation voltage and outputting the offset compensation voltage; and converting a second analog signal corresponding to a difference between the RF signal comprising the offset voltage and the offset compensation voltage into a second digital signal and outputting the second digital signal.

The operation of converting the first analog signal into the first digital signal may comprise the sub-operations of subtracting the analog reference signal from the RF signal and outputting the first analog signal and converting the first analog signal into the first digital signal.

The operation of converting the first digital signal into the offset compensation voltage may comprise the sub-operations of: storing the first digital signal in a memory unit in response to a compensation enable signal; converting the first digital signal stored in the memory unit into the offset compensation voltage; and multiplexing the offset compensation voltage in response to the compensation enable signal and outputting a result of the multiplexing.

Before the operation of converting the first analog signal into the first digital signal, the method may further comprise the operation of detecting an envelope of an RF transmission signal output by an RF transmitter, performing low-pass filtering on the envelope, and outputting the RF signal.

The method may further comprise the operation of evaluating the second digital signal on the basis of a clock signal and at least one reference signal corresponding to at least one threshold voltage and outputting the evaluated second digital signal as an RF demodulation signal.

MODE OF THE INVENTION

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. Like reference numerals in the drawings denote like elements.

FIG. 1 is a function block diagram of a demodulator 10 according to an embodiment of the present invention. FIG. 2 is a function block diagram of an output unit 50 of the demodulator 10 illustrated in FIG. 1.

Referring to FIGS. 1 and 2, the demodulator 10, which may be implemented in a radio frequency (RF) card reader, may include an envelope detector/low-pass filter (LPF) block 20, an offset voltage compensation unit 30, and the output unit 50.

The envelope detector/LPF block 20 detects an envelope of an RF reception signal $V_{RX}$ including an offset voltage received from an RF transmitter (not shown) and performs low-pass filtering on the detected envelope so as to generate an RF signal $V_R$. The RF transmitter may be an RF tag, and the RF signal $V_R$ includes the offset voltage.

The offset voltage compensation unit 30 converts a first analog signal V1 corresponding to a difference between the RF signal $V_R$ including the offset voltage and an analog reference signal Vref into a first digital signal V11, converts the first digital signal V11 into an offset compensation voltage Voc, converts a second analog signal V2 corresponding to a difference between the RF signal $V_R$ including the offset voltage and the offset compensation voltage Voc into a second digital signal V21, and outputs the second digital signal V21.

The offset compensation voltage Voc is an analog voltage corresponding to the first digital signal V11 from among digital signals having a plurality of resolutions (for example, if a digital signal is represented as 4 bits, digital signals [0000] through [1111] are generated).

For example, when the size of the RF signal $V_R$ is 1.72 V and the offset voltage of the RF signal $V_R$ is 0.07V, the offset voltage compensation unit 30 may convert the first analog signal V1 (for example, 0.07V) corresponding to the difference between the RF signal $V_R$ including the offset voltage (for example, 1.72V) and the analog reference signal Vref (for example, 1.65V) into the first digital signal V11 (for example, 1010), convert the first digital signal V11 into the offset compensation voltage Voc (for example, 1.725V), convert the second analog signal V2 (for example, −0.005V) corresponding to the difference between the RF signal $V_R$ having the offset voltage and the offset compensation voltage Voc into the second digital signal V21 (for example, 0111), and output the second digital signal V21.

The offset voltage compensation unit 30 may include an analog-to-digital conversion (ADC) unit and a compensation voltage generation unit 36. The ADC unit includes a subtractor 32 and an analog-to-digital converter (ADC) 34 and converts the first analog signal V1 corresponding to the difference between the RF signal $V_R$ including the offset voltage and the analog reference signal Vref into the first digital signal V11.

Upon detection of the offset compensation voltage Voc of the compensation voltage generation unit 36, for example, in a period t1 when a compensation enable signal En_cal is in a first logic state (for example, a logic low) after a power signal Rx_pwdn is applied as shown in FIG. 3, the subtractor 32 subtracts the analog reference signal Vref from the RF signal $V_R$ so as to generate the first analog signal V1.

Upon compensation of the offset compensation voltage Voc of the compensation voltage generation unit 36, for example, at a point in time t2 when the compensation enable signal En_cal transits from the first logic level (for example, a logic low) to a second logic level (for example, a logic high), the subtractor 32 subtracts the offset compensation voltage Voc from the RF signal $V_R$ so as to generate the second analog signal V2.

In another embodiment of the present invention, the subtractor 32 may be implemented as an adder (not shown). In this case, the analog reference signal Vref or the offset voltage compensation voltage Voc may be inverted and then input to the adder.

Upon detection of the offset compensation voltage Voc of the compensation voltage generation unit 36, the ADC 34 converts the first analog signal V1 output by the subtractor 32 into the first digital signal V11. Upon compensation of the offset compensation voltage Voc of the compensation voltage generation unit 36, the ADC 34 converts the second analog signal V2 into the second digital signal V21.

The compensation voltage generation unit 36 converts the first digital signal V11 generated by the ADC unit into the offset compensation voltage Voc. The compensation voltage generation unit 36 may include a memory unit 38, a digital-to-analog converter (DAC) 39, and a MUX 40. The memory unit 38 receives and stores the first digital signal V11 in response to the compensation enable signal En_cal.

The memory unit 38 stores the first digital signal V11 in response to the compensation enable signal En_cal. The memory unit 38 may be implemented as a non-volatile memory device (e.g., flash EEPROM) or a volatile memory device (e.g., SDRAM or DDR SDRAM). Alternatively, the memory unit 38 may be implemented as a flipflop. The DAC 39 converts the first digital signal V11 stored in the memory unit 38 into the offset compensation voltage Voc.

The MUX 40 outputs the analog reference signal Vref or the offset voltage compensation voltage Voc to the subtractor 32 in response to the compensation enable signal En_cal. For example, when the compensation enable signal En_cal is in the first logic level (for example, a low level), the MUX 40 outputs the analog reference signal Vref to the subtractor 32. Alternatively, when the compensation enable signal En_cal is in the second logic level (for example, a high level), the MUX 40 outputs the offset voltage compensation voltage Voc to the subtractor 32.

Accordingly, in the current embodiment of the present invention, the first digital signal V11 is stored in the memory unit 38 and converted into the offset compensation voltage Voc by the DAC 39, and the offset voltage is compensated for by the ADC unit. Thus, although the size of the RF signal $V_R$ varies, the offset voltage included in the RF signal $V_R$ can be compensated for.

The output unit 50 evaluates the second digital signal V21 on the basis of the clock signal CLK and at least one reference signal (e.g., 1st bits and 2nd bits) corresponding to at least one threshold voltage and outputs the evaluated second digital signal V21 as an RF demodulation signal Vout. The output unit 50 may include a flipflop unit 51 and an evaluation unit 53. The flipflop unit 51 includes a plurality of flipflops that include a first flipflop 52. Each of the flip-flops latches a corresponding square wave from among square waves that constitute the second digital signal V21.

For example, the first flipflop 52 latches a first square wave (not shown) from among the square waves (not shown) that constitute the second digital signal V21, on the basis of the clock signal CLK. The first flipflop 52 may include an input port D for receiving the first square wave (not shown), a clock port C for receiving the clock signal CLK, an output port Q, and a reset port R for receiving a reset signal STC.

The evaluation unit 53 receives output signals of the flipflop unit 51, evaluates the received output signals of the flipflop unit 51 on the basis of the at least one reference signal (e.g., 1st bits and 2nd bits) corresponding to the at least one threshold voltage, and outputs each of the evaluated signals as the RF demodulation signal Vout.

The reference signal (e.g., 1st bits and 2nd bits) may be a digital code corresponding to the at least one threshold voltage from among a plurality of digital codes.

For example, when a size of the output signals of the flipflop unit 51 is greater than a size (for example, 1.68v) of a signal corresponding to a first reference signal (i.e., 1st bits), the evaluation unit 53 outputs a signal with a second logic level (for example, a high level) as the RF demodulation signal Vout. When the size of the output signal of the first flipflop 52 is smaller than the size (for example, 1.68v) of the signal corresponding to the first reference signal (i.e., 1st bits) and greater than a size (for example, 1.62v) of a signal corresponding to a second reference signal (i.e., 2nd bits), the evaluation unit 53 outputs a logic level of a previous state as the RF demodulation signal Vout. When the size of the output signal of the first flipflop 52 is smaller than the size (for example, 1.62v) of the signal corresponding to the second reference signal (i.e., 2nd bits), the evaluation unit 53 outputs a signal with a first logic level (for example, a low level) as the RF demodulation signal Vout.

FIG. 3 is a timing diagram for explaining an operation of the offset voltage compensation unit 30 of FIG. 1. Referring to FIGS. 1 through 3, the period t1 starting after the power signal Rx_pwdn of the demodulator 10 is applied is a period in which the compensation enable signal En_cal is in the first logic level (for example, a low level). In the period t1, the offset compensation voltage Voc of the compensation voltage generation unit 36 is detected.

In other words, the MUX 40 outputs the analog reference signal Vref to the subtractor 32 in response to the compensation enable signal En_cal in the first logic level (for example, a low level), and the subtractor 32 subtracts the analog reference signal Vref from the RF signal $V_R$ including the offset voltage and outputs the first analog signal V1. The ADC 34 converts the first analog signal V1 output by the subtractor 32 into the first digital signal V11 and outputs the first digital signal V11.

At the point in time t2, that is, at the moment when the compensation enable signal En_cal transits from the first logic level (for example, a low level) to the second logic level (for example, a high level), the memory unit 38 receives and stores the first digital signal V11, and the DAC 39 converts the first digital signal V11 stored in the memory unit 38 into the offset compensation voltage Voc. The MUX 40 outputs the offset voltage compensation voltage Voc to the subtractor 32 in response to the compensation enable signal En_cal in the second logic level (for example, a high level).

The subtractor 32 subtracts the offset compensation voltage Voc from the RF signal $V_R$ and outputs the second analog signal V2. The ADC 34 converts the second analog signal V2 into the second digital signal V21. The output unit 50 evaluates the second digital signal V21 on the basis of the clock signal CLK and the reference signal (for example, 1st bits and 2nd bits) corresponding to the at least one threshold voltage and outputs the evaluated second digital signal V21 as the RF demodulation signal Vout.

Accordingly, in the current embodiment of the present invention, distortion and an SNR of the RF signal $V_R$ are reduced by compensating for the offset voltage included in the RF signal $V_R$. Thus, reception sensitivity of an RF receiver (not shown) can be improved.

FIG. 4 is a flowchart of a method of compensating for the offset voltage of the RF signal $V_R$, according to an embodiment of the present invention. Referring to FIGS. 1 and 4, in operation S10, the ADC unit 34 converts the first analog signal V1 corresponding to the difference between the RF signal $V_R$ including the offset voltage and the analog reference signal Vref into the first digital signal V11 and outputs the first digital signal V11.

In operation S12, the compensation voltage generation unit 36 converts the first digital signal V11 into the offset compensation voltage Voc. In operation S14, the ADC unit 34 converts the second analog signal V2 corresponding the difference between the RF signal $V_R$ including the offset voltage and the offset compensation voltage Voc into the second digital signal V21 and outputs the second digital signal V21.

In operation S16, the output unit 50 evaluates the second digital signal V21 on the basis of the clock signal CLK and the reference signal (for example, 1st bits and 2nd bits) corresponding to the at least one threshold voltage and outputs the evaluated second digital signal V21 as the RF demodulation signal Vout.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

As described above, the present invention may be used in demodulators. In addition, a demodulator according to the present invention may be used in RF card readers.

The invention claimed is:
1. A demodulator comprising:
an ADC (analog-to-digital conversion) unit converting a first analog signal corresponding to a difference between an RF (radio frequency) signal comprising an offset voltage and an analog reference signal into a first digital signal; and
a compensation voltage generation unit converting the first digital signal into an offset compensation voltage, wherein the ADC unit converts a second analog signal corresponding to a difference between the RF signal comprising the offset voltage and the offset compensation voltage into a second digital signal.

2. The demodulator of claim 1, wherein the ADC unit comprises:
a subtractor subtracting the analog reference signal from the RF signal so as to output the first analog signal; and
is an ADC (analog-to-digital converter) converting the first analog signal output by the subtractor into the first digital signal,
wherein the subtractor subtracts the offset compensation voltage from the RF signal so as to output the second analog signal, and the ADC converts the second analog signal into the second digital signal.

3. The demodulator of claim 1, wherein the compensation voltage generation unit comprises:
a memory unit storing the first digital signal in response to a compensation enable signal;
a DAC (digital-to-analog converter) converting the first digital signal stored in the memory unit into the offset compensation voltage; and
a MUX outputting one of the analog reference signal and the offset compensation voltage in response to the compensation enable signal.

4. The demodulator of claim 1, further comprising an envelope detector/low-pass filter block detecting an envelope of an RF transmission signal output by an RF transmitter, performing low-pass filtering on the envelope, and outputting the RF signal.

5. The demodulator of claim 1, further comprising an output unit evaluating the second digital signal on the basis of a clock signal and at least one reference signal corresponding to at least one threshold voltage and outputting the evaluated second digital signal as an RF demodulation signal.

6. The demodulator of claim 5, wherein the demodulator is implemented in an RF card reader.

7. A method of compensating for an offset voltage of an RF signal, the method comprising:
converting a first analog signal corresponding to a difference between the RF signal comprising an offset voltage and an analog reference signal into a first digital signal;
converting the first digital signal into an offset compensation voltage and outputting the offset compensation voltage; and
converting a second analog signal corresponding to a difference between the RF signal comprising the offset voltage and the offset compensation voltage into a second digital signal and outputting the second digital signal.

8. The method of claim 7, wherein the converting of the first analog signal into the first digital signal comprises:
subtracting the analog reference signal from the RF signal and outputting the first analog signal; and
converting the first analog signal into the first digital signal.

9. The method of claim 7, wherein the converting of the first digital signal into the offset compensation voltage comprises:
storing the first digital signal in a memory unit in response to a compensation enable signal;
converting the first digital signal stored in the memory unit into the offset compensation voltage; and
multiplexing the offset compensation voltage in response to the compensation enable signal and outputting a result of the multiplexing.

10. The method of claim 7, before the converting of the first analog signal into the first digital signal, further comprising detecting an envelope of an RF transmission signal output by an RF transmitter, performing low-pass filtering on the envelope, and outputting the RF signal.

11. The method of claim 7, further comprising evaluating the second digital signal on the basis of a clock signal and at least one reference signal corresponding to at least one threshold voltage and outputting the evaluated second digital signal as an RF demodulation signal.

* * * * *